US005634200A

United States Patent [19]

Kitakubo et al.

[11] Patent Number: 5,634,200

[45] Date of Patent: May 27, 1997

[54] ANTENNA DUPLEXER AND TRANSMITTING/RECEIVING APPARATUS USING THE SAME

[75] Inventors: Kazuto Kitakubo; Ryuji Oki, both of Tokyo; Shinichi Hirota, Kanagawa; Sachio Iida, Chiba, all of Japan

[73] Assignee: Sony Corporation, Tokyo, Japan

[21] Appl. No.: 593,553

[22] Filed: Jan. 30, 1996

Related U.S. Application Data

[63] Continuation of Ser. No. 217,871, Mar. 25, 1994, abandoned.

[30] Foreign Application Priority Data

Mar. 30, 1993 [JP] Japan .................................... 5-096825

[51] Int. Cl.[6] ................................ H04B 1/44; H01P 1/10

[52] U.S. Cl. .............................. 455/82; 455/83; 333/104; 333/132

[58] Field of Search .................................. 455/73, 78, 80, 455/82, 83, 84; 333/103, 104, 126, 129, 132, 134

[56] References Cited

U.S. PATENT DOCUMENTS

| | | | |
|---|---|---|---|
| 3,452,299 | 6/1969 | Angel | 333/103 |
| 4,677,688 | 6/1987 | Yoshihara | 455/82 |
| 5,023,866 | 6/1991 | De Muro | 333/126 |
| 5,129,098 | 7/1992 | McGirr | 455/73 |

FOREIGN PATENT DOCUMENTS

| | | | |
|---|---|---|---|
| 0578160 | 1/1994 | European Pat. Off. | H01Q 1/00 |
| 61-148924 | 7/1986 | Japan | H04B 1/44 |
| 0108301 | 4/1990 | Japan | 333/104 |
| 404339422 | 11/1992 | Japan | 455/82 |
| 405055803 | 3/1993 | Japan | 333/103 |
| 1149043 | 4/1969 | United Kingdom | H04B 1/48 |

OTHER PUBLICATIONS

Ayasli et al., 6–10 *GHz GaAs FET Transmit–Receive Switch*, IEEE GaAs IC Symposium pp. 106–108 (1983).

*Primary Examiner*—Reinhard J. Eisenzopf
*Assistant Examiner*—Thanh Le
*Attorney, Agent, or Firm*—Jay H. Maioli

[57] ABSTRACT

In an antenna duplexer, one antenna is used by switching transmission signals and reception signals having different frequencies. The antenna duplexer includes a high-frequency switching circuit and a band-pass filter. The high-frequency switching circuit supplies the transmission signals from a transmission part to the antenna. The band-pass filter outputs the reception signals outputted from the antenna to the predetermined receiving circuit. In the band-pass filter, the frequency characteristic is selected and set to impress the frequency of the transmission signals, and simultaneously the reflected wave generated at the input end so that impedance increases at the frequency band of the transmission signals.

16 Claims, 7 Drawing Sheets

ANTENNA DUPLEXER AND TRANSMITTING/RECEIVING APPARATUS USING THE SAME

This is a continuation of application Ser. No. 08/217,871 filed Mar. 25, 1994, abandoned.

BACKGROUND OF THE INVENTION

1. Field of the Invention

This invention relates to an antenna duplexer and a transmitting/receiving apparatus using the antenna duplexer, and more particularly, relates to an antenna duplexer and a transmitting/receiving apparatus having an antenna which is alternatively used with a transmission signal and a reception signal the frequencies of which are different from each other.

2. Description of the Related Art

Heretofore, in a time division multiplexed radio communication system, such as a digital car telephone, transmission and reception frequencies are set to be different from each other, and an antenna is alternatively used for transmission and reception by means of an antenna.

For a car telephone, the practical size on an antenna is limited and a terminal unit must be downsized in consideration of the convenience of users. Therefore, it is difficult to use two separate antennas, each exclusively used for transmission and reception, respectively. Thus, one antenna is shared for transmission and reception in the car telephone.

The antenna duplexer is composed of a duplexer circuit or a switching circuit having diodes and transistors.

As shown in FIG. 1, an antenna duplexer 1 sends a transmission signal STX outputted from a transmitting circuit through a band-pass filter (BPF) 2 to a phase shifting circuit 3, an output of which is connected to an antenna 4.

The antenna 4 is further connected to a phase shifting circuit 5 of the receiving side, an output signal of which is delivered to a receiving circuit through a band-pass filter 6.

As shown in FIG. 2, each of the band-pass filters 2 and 6 is composed of a filter with a steep out-of-band damping characteristic in which the frequency bands fT and fR of a transmission signal STX and a reception signal SRX are respectively selected as a pass band so that the reception signal SRX and the transmission signal STX are adequately suppressed.

The antenna duplexer 1 selectively transmits the transmission signal STX output from the transmitting circuit to the antenna 4 and also selectively receives the reception signal SRX picked up by the antenna 4 to the receiving circuit.

The phase shifting circuits 3 and 5 are respectively selected so as to have a predetermined phase characteristic in order to achieve matching with the antenna 4.

However, as shown in FIG. 3, some cases can be considered in which a switching circuit is composed of diodes to thereby share one antenna 4 for transmission and reception.

An antenna duplexer 10 shown in FIG. 3 sends the transmission signal STX to an anode of a diode 12 constituting a high-frequency switch through a capacitor 11 for cutting off a direct current. A cathode of the diode 12 is connected to the antenna 4 through a capacitor 13 for cutting off a direct current.

The antenna 4 is further connected to a cathode of a diode 14 constituting a high-frequency switch through the capacitor 13 for cutting off a direct current. An anode of the diode 14 is connected to a receiving circuit through a capacitor 15 for cutting off a direct current.

The cathodes of the diodes 12 and 14 are grounded in connection with direct current through a choke coil 16 and the anodes of the diodes 12 and 14 are connected to a selector circuit 19 through choke coils 17 and 18.

The selector circuit 19 inputs an output voltage of a DC power supply 20 through a resistance 21 to selectively output the output voltage to the choke coils 17 and 18. Terminals of the choke coils 17 and 18 at the selector circuit 19 are grounded through DC-cutting-off capacitors 22 and 23, respectively.

The diodes 12 and 14 are turned on for transmission and reception, respectively, to selectively connect a transmitting circuit and receiving circuit to the antenna 4.

The antenna duplexer 1 shown in FIG. 1 has a problem that, because the band-pass filters 2 and 6 with a steep out-of-band damping characteristic are generally large in size, the size of the antenna duplexer 1 increases by the dimensions of the band-pass filters 2 and 6 and the insertion loss of the filters increases.

The antenna duplexer 10 having the configuration shown in FIG. 3 has a problem that, because bias current should be supplied to the transmission-side diode 12 during transmission and the reception-side diode 14 during reception, the power consumption increases by a value equivalent to the bias current.

Particularly, a portable telephone has a problem that the power consumption increases by a value equivalent to the bias current even while it is not in use and thereby the operating life decreases.

To solve the problem, as shown in FIG. 4, a method for sharing one antenna by constructing a switching circuit consisting of four transistors (FETs) instead of diodes can be considered.

In an antenna duplexer 35 shown in FIG. 4, the transmission signal STX is sent to the capacitor 13 through a transistor 36 and the capacitor 13 is connected to the capacitor 15 through a transistor 37.

Thereby, the transistors 36 and 37 are turned on during transmission and reception, respectively, to selectively connect the antenna 4 to a transmitting circuit and receiving circuit.

Moreover, the terminals of the capacitors 11 and 15 are grounded at the transistors 36 and 37 with transistors 38 and 39. As a result, the transistors 38 and 39 are turned on during transmission and reception, respectively, and the antenna connection ends of the receiving circuit and transmitting circuit are grounded.

The terminals of the capacitors 11, 13, and 15 are grounded through the transistors 36 and 37 and resistances 40, 41, and 42, respectively, to thereby set bias voltages of the transistors 36 to 39.

The gates of the transistors 36 to 39 are connected to the selector circuit 19 through resistances 43 to 46 and output ends of the selector circuit 19 are selectively grounded through a parallel circuit composed of a resistance 47 and a capacitor 48 or a parallel circuit composed of a resistance 49 and a capacitor 50. As a result, a bias voltage is complimentarily supplied to the transistors 36 and 39, and the transistors 37 and 38, respectively.

The terminals of the switching circuit 19 are switched to turn on the transmission-side transistors 36 and 39 or the reception-side transistors 37 and 38, thereby selectively connecting one antenna 4 to a transmitting circuit or receiving circuit.

However, although the power consumption decreases, this method has a problem that four transistors 36 to 39 with a small high-frequency on-resistance must be used and the transistors 36 to 39 cannot freely be selected.

Alternatively, a method for sharing one antenna by using a line equivalent to ¼ wavelength of the transmission frequency as shown in FIG. 5 can be also considered.

In antenna duplexer 55 shown in FIG. 5, the transmission signal STX is output to the antenna 4 through a diode 56 and the capacitor 13, and a terminal of the capacitor 13 at the diode 56 is connected to a distributed-constant line 57.

In this case, the distributed-constant line 57 is composed of a line equivalent to ¼ wavelength of the transmission frequency, an output end of which is grounded at the capacitor 15 in connection with high frequency components so that the output end is equalized with an open end when considering the distributed-constant line 57 from the antenna 4.

The antenna duplexer 55 constitutes a loop circuit for supplying a bias current to the diode 56 with a resistance 58, capacitor 59, choke coil 60, and diode 61 and a positive DC voltage is supplied to a bias terminal TB of the resistance 58 so that the bias current can be supplied to the diode 56.

The antenna duplexer 55 is supplied the transmission signal STX from the capacitor 11 to the antenna 4 when supplying the bias current to the diode 56 to turn on the diode 56. At this time, the diode 61 is turned on to ground a terminal of the capacitor 15 at the distributed-constant line in high frequency.

Therefore, by stopping supply of the bias current to the diode 56, the reception signal SRX received by the antenna 4 is output to the receiving circuit through the distributed-constant line 57.

This system has an advantage that it is unnecessary to make the bias current flow through the diodes 56 and 61 during reception. However, it has a problem that a state equivalent to a case in which an inductance is connected in series by a package of the reception-side diode 61 or the like is obtained and thereby isolation deteriorates between the diodes 56 and 61 and the receiving circuit.

Moreover, there is a problem that since the ¼-wavelength line is large in size, the whole radio communication device becomes large for the line.

In this case, as shown in FIG. 6, a method for decreasing the overall size by replacing the ¼-wavelength line with a lumped-constant circuit consisting of capacitors 63 and 64 and a coil is considered. However, this method has a problem that insertion loss increases due to decrease of a selectivity "Q" of a circuit comprising small coils and capacitors compared with a case using a transmission line.

A problem common to cases using a switching circuit is that, even if a diode or transistor is kept turned off, a capacitance between input and output of the diode or transistor cannot be removed completely. As a result, the deterioration of isolation between transmission and reception cannot be avoided and insertion loss increases.

Moreover, when using a switching circuit, a band-pass filter in which a reception band is selected as a pass band must be inserted between the switching circuit and a receiving circuit, like the band pass filter of the antenna duplexer 1. As a result, there is another problem that the insertion loss during reception increases and the sensitivity of reception decreases.

SUMMARY OF THE INVENTION

It is an object of the present invention to provide an antenna duplexer which resolves the above-mentioned problems.

It is another object of the present invention to provide a transmitting/receiving apparatus which resolves the above-mentioned problems.

The foregoing objects and other objects of the invention have been achieved by the provision of an antenna duplexer with a simple construction capable of decreasing insertion loss and power consumption by sharing one antenna for transmission and reception.

According to the present invention, there is provided an antenna duplexer 75, in which one antenna 4 is shared by switching for a transmission signal STX and a reception signal SRX having the different frequencies, comprising a high-frequency switching circuit 80 and a band-pass filter 82. The high-frequency switching circuit 80 supplies the transmission signal STX to the antenna 4. The band-pass filter 82 outputs the reception signal SRX output from the antenna 4 to a predetermined receiving circuit 76. The band-pass filter 82 is set so as to have a frequency characteristic for suppressing the frequency components of the transmission signal STX and it holds a reflected wave generated at an input end at a predetermined phase so that impedance increases in the frequency band of the transmission signal STX.

According to the present invention, there is provided a transmitting/receiving apparatus for transmitting and receiving a transmission signal and a reception signal with the different frequencies by switching one antenna comprising a transmitter/receiver, a first signal processing part, a transmission part, a modulation part, an antenna sharing unit, a reception part, a demodulation part, and a second signal processing part. The transmitter/receiver has a microphone and a speaker. The first signal processing part converts the output signal output from the microphone of the transmitter/receiver into a transmission base band signal. The modulation part performs the predetermined modulation to the transmission base band signal output from the first signal processing part. The transmission part converts the modulated signal output from the modulation part into the predetermined transmission signal. The antenna duplexer unit receives the transmission signal output from the transmission part and transmits through an antenna, and simultaneously outputs the reception signal received through the antenna. The reception part receives the signal received by antenna and output from the antenna duplexer unit and converts the signal received by the antenna to the reception signal. The demodulation part performs demodulation processing corresponding to the modulation processing which is performed in the modulation part to the reception signal output from the reception circuit. The second signal processing part converts the base band signal output from the demodulation part into the audio signal to supply the speaker of the transmitter/receiver. The antenna duplexer comprises the high-frequency switching circuit for supplying the transmission signal to the antenna and the band-pass filter for outputting the signal output from the antenna into the reception part. In the band-pass filter, the frequency characteristic is selected and set to suppress the frequency components of the transmission signal, and a reflected wave generated at an input end is held to a predetermined phase so that impedance increases in the frequency band of the transmission signal.

According to the present invention, the input impedance of the band-pass filter at the reception part side is set so as set to become high-impedance at the transmission frequency band, and further, the transmission signal is supplied to the antenna via the high-frequency switch, so that the switching circuit for separating the reception part at transmission can be omitted. As a result, this invention can provide the antenna duplexer and the transmitting/receiving apparatus which are smaller and capable of decreasing insertion loss during the transmitting operation and power consumption during the receiving operation.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention which relate to an antenna duplexer and a transmitting and receiving apparatus utilized with this antenna duplexer will be described with reference to the accompanying drawings:

First, an antenna duplexer and a transmitting and receiving apparatus utilized with this antenna duplexer according to the first embodiment of this invention is described below with reference to FIGS. 7 to 12.

Figure 7:
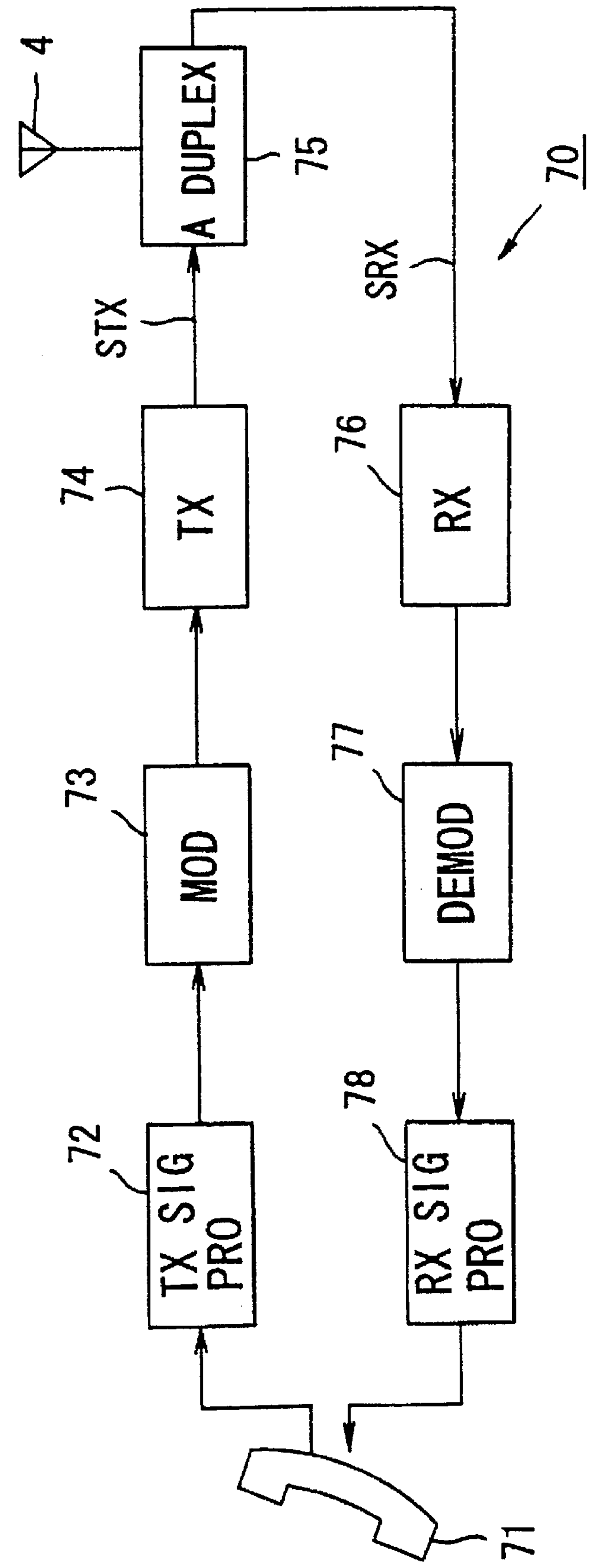
FIG. 7 is a block diagram showing the constitution of the digital car telephone according to the present invention.

In FIG. 7, numerical 70 represents a digital car telephone as a whole, which is constructed so that a person can talk with any other person by means of TDMA (time division multiple access).

That is, the digital car telephone 70 repeats transmission and reception at a period of approximately 20 [msec] by using the bands of transmission frequencies from 940 to 956 [MHz] and reception frequencies from 810 to 826 [MHz] and thereby sends voice signals to a predetermined base station and receives voice signals transmitted from the base station. The transmission and reception frequencies are set so that they are separate from each other by 130 [MHz].

The digital car telephone 70 converts a voice into voice signals with a microphone of a handset 71, converts the voice signals into digital signals with a TX signal processing circuit 72 which is a transmission base band signal processing part, and generates data suitable for a transmission slot.

Moreover, the digital car telephone 70 modulates the data into π/4 shift DQPSK signals with a modulator (MOD) 73, and thereafter converts the frequency of the signals into a predetermined radio frequency with a transmitting part (TX) 74, amplifies the power of the signals, and outputs the signals to the antenna duplexer 75.

Thereby, the digital car telephone 70 transmits voice signals through the antenna 4 in a predetermined format.

The digital car telephone 70 sends the reception signal SRX input through the antenna duplexer 75 to the receiving section (RX) 76 and performs frequency conversion there to receive a predetermined channel.

Furthermore, the digital car telephone 70 demodulates the π/4 shift DQPSK signals received by the receiving section 76 into digital signals with a demodulator (DEMOD) 77 and further demodulates them into voice signals with an RX signal processing circuit 78 which is a reception base band processing section.

Thereby, the digital car telephone 70 outputs the voice signals to a speaker of the handset 71.

In this case, the antenna duplexer 75 efficiently transmits transmission power to the antenna 4 during transmission, and separates the receiving part 76 in high frequency so that the receiving part 76 is not broken down by the transmission power. Also, the antenna duplexer 75 efficiently supplies high-frequency signals received by the antenna 4 to the receiving part 76 during reception.

Figure 8:
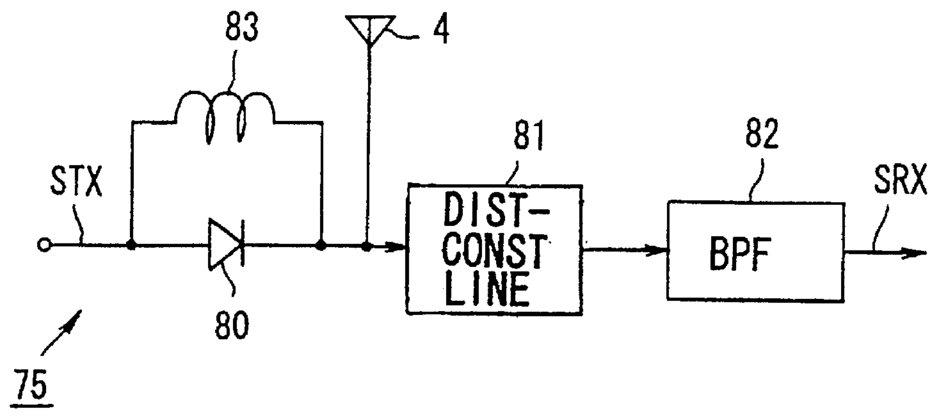
FIG. 8 is a connection diagram showing the basic constitution of an antenna duplexer according to the present invention.

The antenna duplexer 75 is constructed so as to have a basic circuit layout shown in FIG. 8. However, the description of a bias circuit of the diode 80 is omitted for easy understanding.

The antenna duplexer 75 supplies the output signal STX of the transmitting part 74 to the antenna 4 through the diode 80 for a high-frequency switch comprising a PIN diode.

The antenna duplexer 75 outputs the reception signal SRX received by the antenna 4 to the band-pass filter 82 through the phase-shifting distributed-constant line 81.

Figure 9:
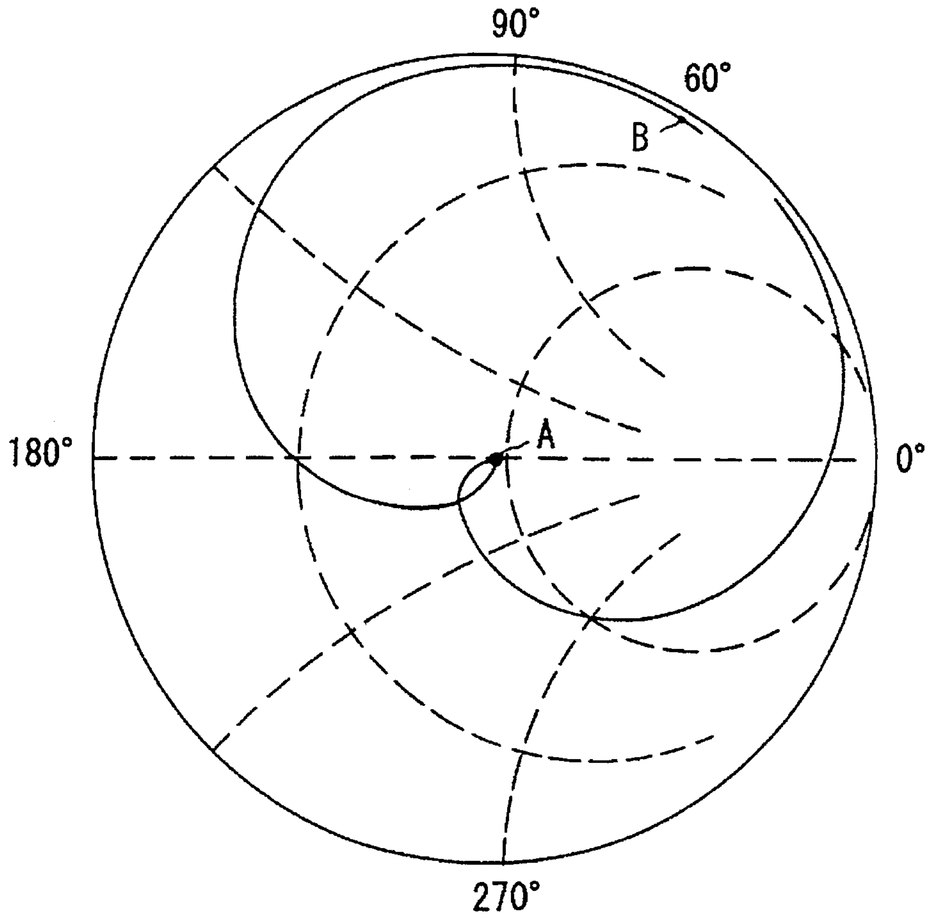
FIG. 9 is a Smith chart showing the characteristic of a filter.

The band-pass filter 82, as shown by the impedance characteristic viewed from the distributed-constant line 81 with loci on Smith chart in FIG. 9, is kept in a pass band at the almost central portion of Smith chart (point A) so that it is matched with the characteristic impedance $Z_0$ of the distributed-constant line 81 in the frequency band of the reception signal SRX between 810 and 826 [MHz].

However, the impedance of the band-pass filter 82 is present at the periphery (point B) of Smith chart in the frequency band between 940 and 956 [MHz] of the transmission signal STX and thereby it is kept in the cut-off band. For this embodiment, a reflected wave is obtained at a phase of approximately +60° (=λ/6) in this band.

Therefore, the antenna duplexer 75 is constructed so as to selectively transmit the reception signal SRX to the receiving part 76 by omitting a switching circuit for separating the receiving part 76. In this case, by setting the diode 80 to a high impedance state, it is possible to efficiently transmit the reception signal SRX to the receiving part 76 and effectively prevent the receiving part 76 from being broken down due to the transmission output STX by suppressing the transmission signal STX.

Meanwhile, the distributed-constant line 81 is set to the characteristic impedance $Z_0$ equal to the impedance of the antenna 4 and the overall length is selected so that the phase is delayed by λ/12 between input and output ends in the transmission frequency.

Therefore, the antenna duplexer 75 delays the phase of the reflected wave λ/6 advanced by the band-pass filter 82 by λ/6 to output the reflected wave to the antenna 4.

Figure 10:
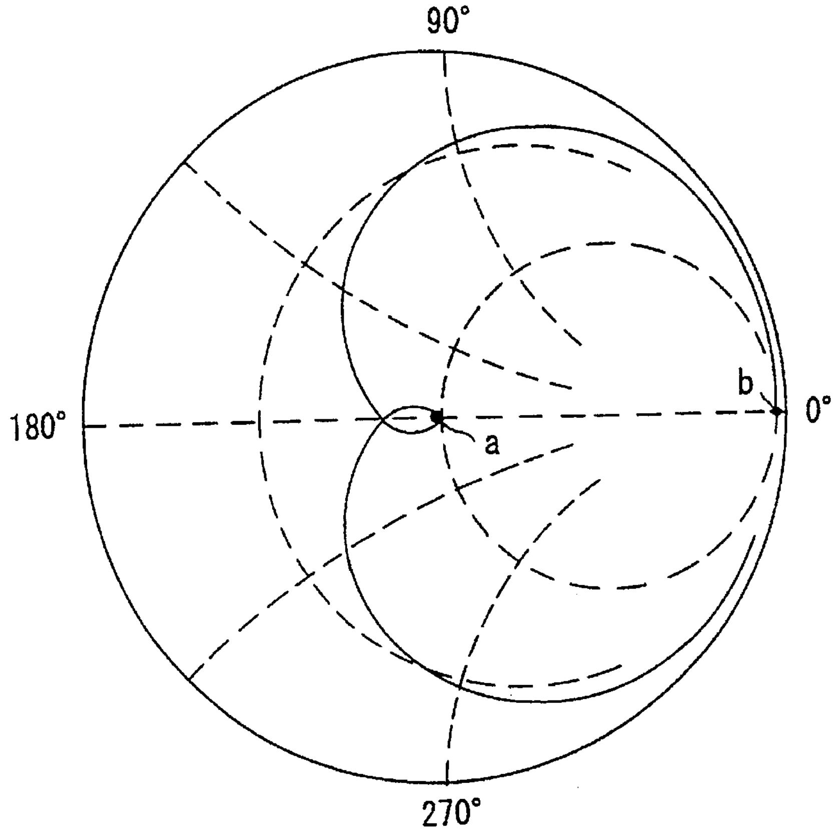
FIG. 10 is a Smith chart showing the impedance on the antenna end side.

Thus, as shown by the point "b" in FIG. 10, since the phase of the reflected wave is kept at approximately 0° in the transmission frequency of fT when viewing the receiving part 76 at the antenna side of the distributed-constant line 81, a high impedance state appears in the receiving part 76 and it is regarded that the receiving part 76 is almost opened.

Also, the antenna duplexer 75 is able to decrease leakage of the transmission signal STX to the receiving part 76. Thereby, not only the band-pass filter 82 but also the distributed-constant line 81 are able to decrease the leakage of the transmission signal STX to the receiving part 76 and efficiently transmit the transmission signal STX to the antenna 4.

Since the reception frequency band is kept in the pass band matched with the characteristic impedance shown as the point "a" when viewing the distributed-constant line 81 from the antenna 4, it is found that the reception signal SRX can efficiently be supplied to the receiving part 76.

To change transmission and reception with the antenna duplexer 75, it is necessary to turn on/off a diode switch by switching the bias current of the diode.

However, this type of the diode 80 is characterized in that it is difficult to completely separate the transmitting part 74 from the antenna 4 because capacitance components such as a capacitance between terminals and a capacitance between joints are present even when no bias current flows, that is, even under the reception state.

In this case, in the duplexer 75, the reception signal SRX leaks to the transmitting part 74 during reception and it is thereby difficult to supply the reception signal SRX to the receiving part 76. Moreover, the consistency of a circuit is also impaired due to the influence of the output impedance of the transmitting part 74 in the receiving part 76.

To solve the above problems, the antenna duplexer 75 according to this invention connects a resonant coil 83 with the diode 80 in parallel. In this antenna duplexer 75, the capacitance component of the diode 80 and the inductance component of the resonant coil 83 are parallel-resonated at the reception frequency fR. Thus, the antenna duplexer 75 sets so an impedance such that the transmitting part 74 is apparently open when viewing the part 74 from the antenna 4 and increases the isolation between the antenna 4 and transmitting part 74 at the reception frequency.

Figure 11:
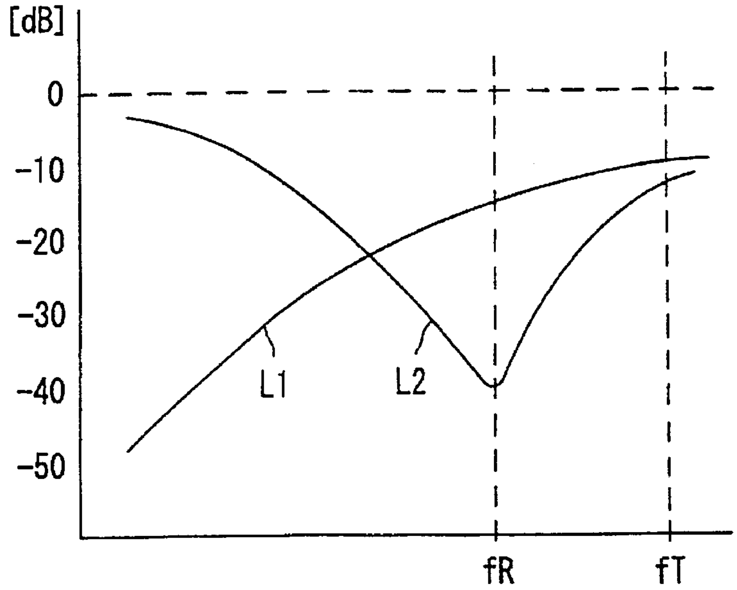
FIG. 11 is a characteristic diagram for explaining an operation of a resonant coil.

FIG. 11 shows experimental results. In FIG. 11, numeral L1 shows the case where the resonant coil 83 is not connected and numeral L2 shows the case where the resonant coil 83 is connected. As shown by numeral L2, it is found that the isolation of approximately −10 [dB] between the transmitting part 74 and antenna 4 in the case where the resonant coil is not connected can be improved up to approximately −40 [dB] and thereby the reception signal SRX can efficiently be transmitted to the receiving part 76 when the resonant coil 83 is connected.

In this connection, the resonant coil 83 does not affect the pass characteristic during transmission because the both ends of the coil 83 are only shorted by the diode 80 in high frequency.

Figure 12:
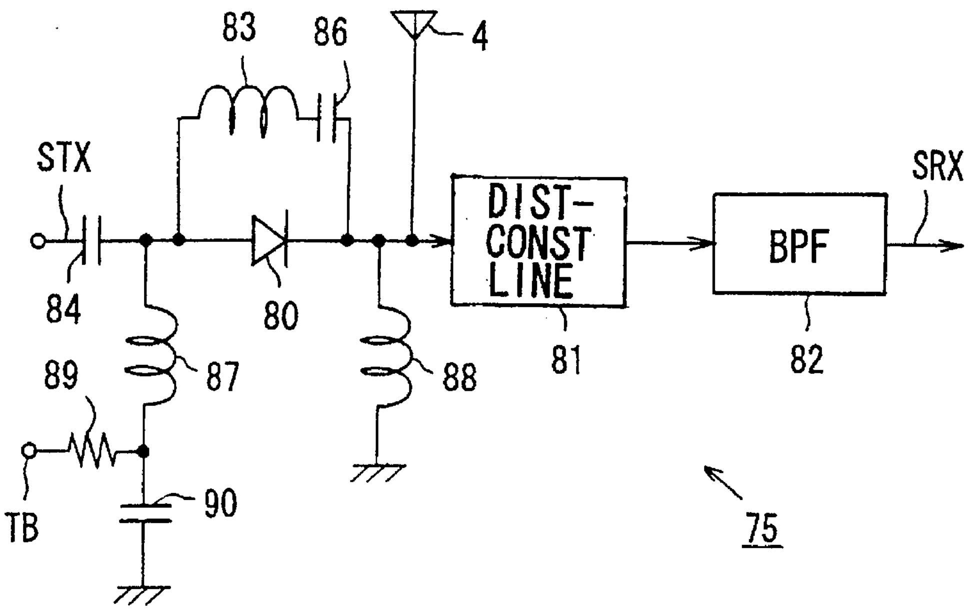
FIG. 12 is a connection diagram showing the concrete constitution of an antenna duplexer as the first embodiment of the present invention.

Concretely, the antenna duplexer 75 is constructed as shown in FIG. 12.

As shown in FIG. 12, in the antenna duplexer 75, capacitors 84 and 86 are connected with the diode 80 and resonant coil 83 in series, respectively, to thereby cut off a direct current.

Moreover, coils 87 and 88 are connected to input and output ends of the diode 80, respectively, the coil 88 is grounded, and the coil 87 is connected with the bias terminal TB through a resistance 89.

The diode 80 is turned on/off by changing bias voltages to be supplied to the bias terminal TB to change the transmission state and the reception state. The connection mid point between the resistance 89 and coil 87 is grounded with a capacitor 90 so as to bypass high-frequency components. When the antenna 4 is directly grounded in connection with a direct current, and, moreover, when an internal terminal of the band-pass filter 82 is grounded in connection with a direct current, the coil 88 can be omitted.

Therefore, because it is unnecessary to supply a bias current during reception, the power consumption in the service waiting time can be decreased when applying the antenna duplexer 75 to a car telephone.

In accordance with the above layout, a band-pass filter and distributed-constant line are constructed so that impedance increases at a transmission frequency when viewing a receiving part from a transmitting part, and transmission and reception are switched by means of a diode connected between the transmitting part and an antenna. Moreover, a resonant coil is connected with the diode in parallel to parallel-resonate them at a reception frequency. This makes it possible to decrease the power consumption and improve the isolation between receiving and transmitting parts.

Thus, it is possible to efficiently carry a reception signal to the receiving part, decrease insertion loss, simplify the construction, decrease the overall size, and decrease insertion loss and power consumption.

Figure 13:
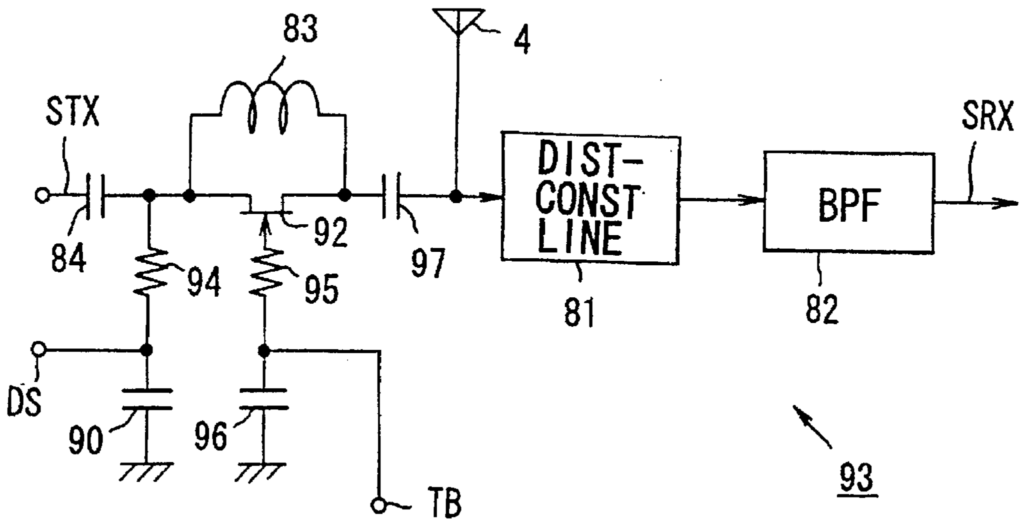
FIG. 13 is a connection diagram of the antenna duplexer according to the second embodiment of the present invention.

Next, the second embodiment of the antenna duplexer according to this invention is described with reference to FIG. 13. In FIG. 13, a portion corresponding to that in FIG. 12 is provided with the same numerals. In FIG. 13, an antenna duplexer 93 is constructed by using a transistor (FET) 92 as a high-frequency switching device instead of the diode 80 in the case of the second embodiment.

The antenna duplexer 93 shown in FIG. 13 uses a depression-type field effect transistor with a gate-source cut-off voltage Vgs (off) of approximately −2 [V] as the transistor 92.

The portion between a drain and source of the transistor 92 is kept under a low impedance state (on state) in high frequency when the gate-source voltage Vgs is set to 0 [V], and it is kept under a high impedance state (off state) in high frequency when the gate-source voltage Vgs is set to the gate-source cut-off voltage Vgs (off) or lower (for example, when the voltage Vgs is set to −5 [V]).

In the antenna duplexer 93, similar to the case of the first embodiment, the resonant coil 83 is connected with the transistor 92 in parallel. And, by parallel-resonating the drain-source capacitance and the resonant coil 83 when the transistor 92 is turned off, the isolation between a transmitting part and antenna during reception is improved.

The source of the transistor 92 is connected with a power supply terminal DS through a resistance 94 and, moreover, the gate of the transistor 92 is connected with the bias terminal TB through a resistance 95.

The antenna duplexer 93 bypasses a high-frequency component by grounding the power supply terminal DS and bias terminal TB with capacitors 90 and 96 and cuts off a DC component by providing a capacitor 97 between the drain of the transistor 92 and the antenna 4.

The source voltage of the transistor 92 is biased to 5 [V] by applying a power supply voltage, e.g., 5 [V], to the power supply terminal DS and, under this state, the voltage of the bias terminal TB is changed.

When the control voltage of 5 [V] is applied to the bias terminal TB, the gate voltage of the transistor 92 is also biased to 5 [V]. Therefore, the gate-source voltage Vgs is set to 0 [V] and the transistor 92 is kept turned on.

Thereby, the antenna duplexer 93 is kept under the transmission state. In this case, it is possible to keep the impedance when viewing the reception side from the antenna 4 at a large value, similar to the case of the first embodiment, and thereby efficiently output the transmission signal STX to the antenna 4.

When the voltage of the bias terminal TB is changed to 0 [V] to bring the antenna duplexer 93 under the reception state, it is possible to efficiently send the reception signal SRX to the receiving part similarly to the case of the first embodiment. Thus, the power consumption is greatly decreased during not only reception but also during transmission by forming a switching circuit with a field effect transistor.

The arrangement shown in FIG. 13 makes it possible to obtain the same effect as the first embodiment even if a high-frequency switch is fashioned with a field effect transistor instead of a diode. In this case, it is also possible to further decrease the overall size by supplying a bias voltage with the resistances 94 and 95 instead of coils.

Figure 1:
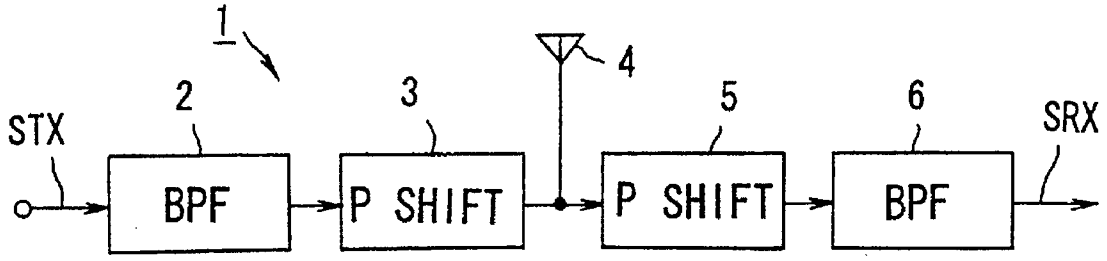
FIG. 1 (RELATED ART)
FIG. 1 is a connection diagram showing an antenna duplexer as a related art.
Figure 2:
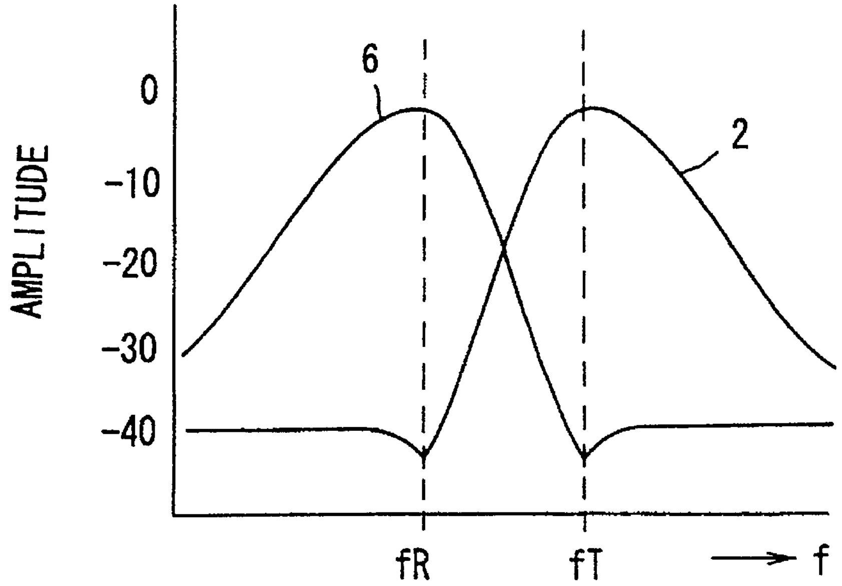
FIG. 2 (RELATED ART)
FIG. 2 is a characteristic curve for explaining an operation of the antenna duplexer shown in FIG. 1.
Figure 3:
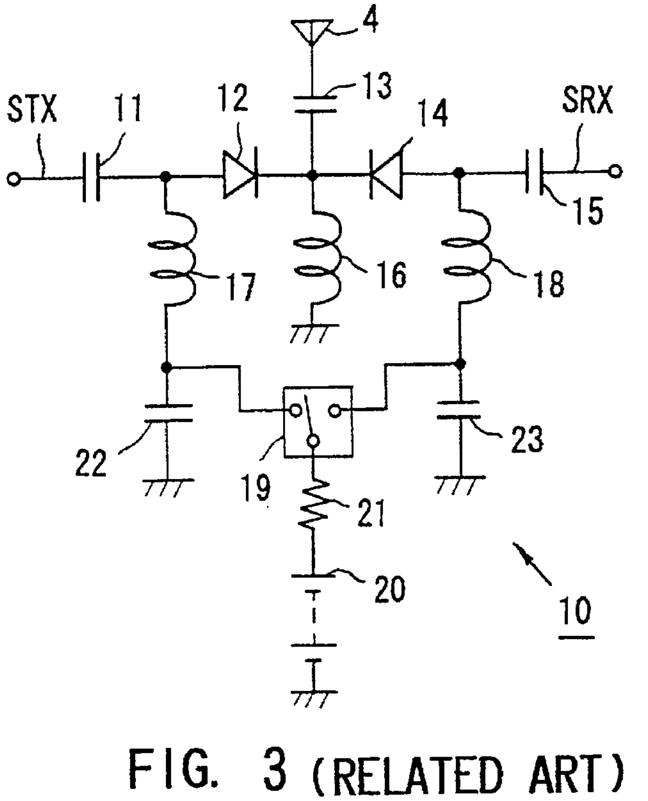
FIG. 3 (RELATED ART)
FIG. 3 is a connection diagram showing a related art case where a diode is used as a switching circuit.
Figure 4:
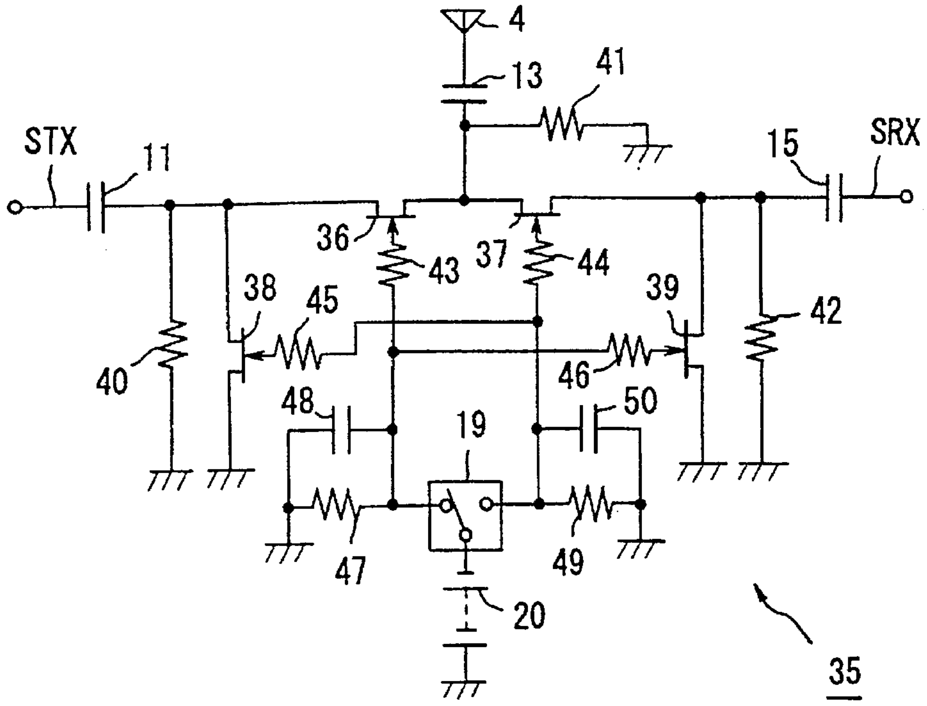
FIG. 4 (RELATED ART)
FIG. 4 is a connection diagram showing a related art case where a transistor is used as a switching circuit.
Figure 5:
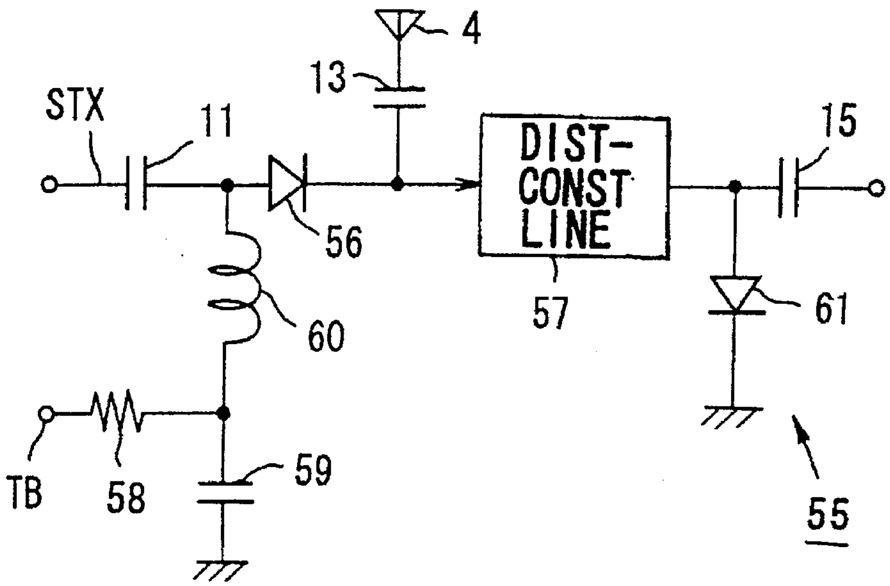
FIG. 5 (RELATED ART)
FIG. 5 is a connection diagram showing a related art case where a distributed-constant line.
Figure 6:
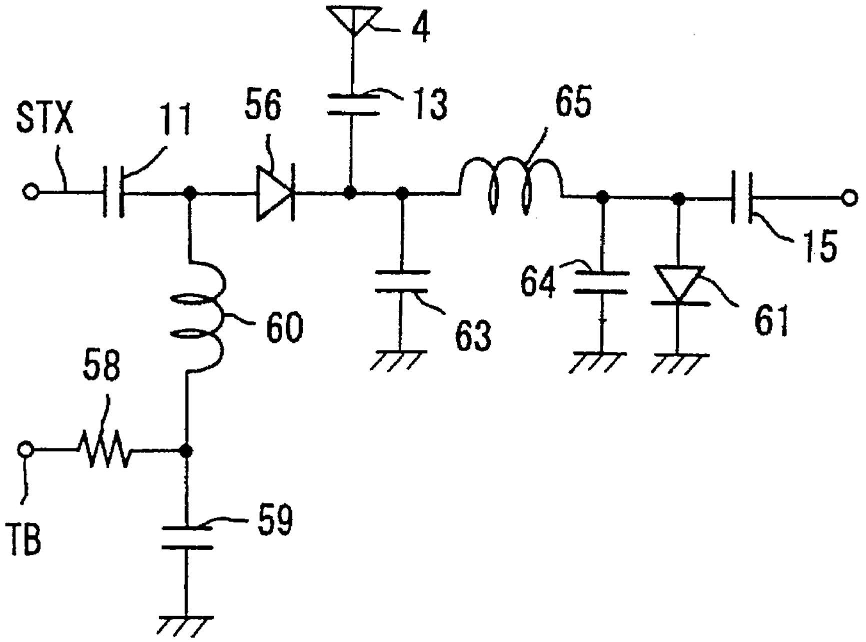
FIG. 6 (RELATED ART)
FIG. 6 is a connection diagram showing a related art case where a distributed-constant line in FIG. 5 is replaced with a lumped-constant circuit.

In the above embodiments, a case is described in which the phase shifting line 81 is constructed with a distributed-constant circuit. However, the present invention is not limited to this, but also, as described above concerning FIG. 6, it may constitute the line 81 with a lumped-constant circuit made by combining coils and capacitors.

Moreover, in the above embodiments, a case is described in which a high impedance state is realized by delaying a reflected wave with the phase shifting line 81. However, the present invention is not only limited to this, but also it may omit the phase shifting line 81 to further decrease the overall size when a band-pass filter has the frequency characteristic described in FIG. 10.

Having provided the above description concerning the preferred embodiments of the invention, it will be obvious to those skilled in the art that various changes and modifications may be proposed, therefore, it is intended to cover in the appended claims all such changes and modifications as fall within the true spirit and scope of the invention.

What is claimed is:

1. An antenna duplexer for sharing one antenna to transmit a transmission signal and receive a reception signal, said transmission signal and said reception signal having different respective frequencies, comprising:

a high-frequency switching circuit for supplying said transmission signal to said antenna, said transmission signal having a first frequency in a first frequency band;

a delay circuit having a characteristic impedance and first and second ends for delaying a signal passing between said first and second ends for a predetermined delay period, said first end of said delay circuit being coupled to said one antenna; and a band-pass filter coupled to said second end of said delay circuit for outputting said reception signal supplied by said antenna to a predetermined receiving circuit, said reception signal having a second frequency in a second frequency band nonoverlapping with said first frequency band, said band-pass filter having a reception impedance at said second frequency in said second frequency band which is matched to said characteristic impedance of said delay circuit and an increased impedance in said first frequency band so as to suppress components of said transmission signal in said first frequency band and to supply a reflected signal having a phase characteristic advanced by a predetermined phase advance period, said reflected signal being delayed by said predetermined delay period while passing through said delay circuit and said reflected signal exiting said delay circuit having a substantially zero degree phase shift from said transmission signal in said first frequency band, wherein a sum of said predetermined delay of said transmission signal passing through said delay circuit and said predetermined delay of said reflected signal passing through said delay circuit is complementary to said predetermined phase advance period.

2. The antenna duplexer according to claim 1, further comprising:

an inductance circuit connected in parallel with said high-frequency switching circuit, said inductance circuit having a predetermined inductance to parallel-resonate together with a capacitance component of said high-frequency switching circuit at said second frequency in said second frequency band.

3. The antenna duplexer according to claim 2, wherein said high-frequency switching circuit comprises a high-frequency switching device.

4. The antenna duplexer according to claim 3, wherein said high-frequency switching device is a diode.

5. The antenna duplexer according to claim 4, wherein said inductance circuit comprises an inductance element and a capacitor connected in series with each other.

6. The antenna duplexer according to claim 4, wherein said high-frequency switching device is a transistor.

7. The antenna duplexer according to claim 1, wherein said characteristic impedance of said delay circuit is equal to an impedance of said antenna.

8. The antenna duplexer according to claim 7, further comprising:

an inductance circuit connected in parallel with said high-frequency switching circuit, said inductance circuit having a predetermined inductance to parallel-resonate together with a capacitance component of said high-frequency switching circuit at said second frequency in said second frequency band.

9. The antenna duplexer according to claim 8, wherein said high-frequency switching circuit comprises a high-frequency switching device.

10. The antenna duplexer according to claim 9, wherein said high-frequency switching device is a diode.

11. The antenna duplexer according to claim 10, wherein said inductance circuit comprises an inductance element and a capacitor connected in series with each other.

12. The antenna duplexer according to claim 9, wherein said high-frequency switching device is a transistor.

13. The antenna duplexer according to claim 1, wherein said high-frequency switching circuit comprises an inductance element and a FET connected in parallel with said inductance element, so as to parallel-resonate a capacitance between a drain and a source of said FET at said second frequency in said second frequency band.

14. A transmitting and receiving apparatus for transmitting transmission signals and receiving reception signals, the transmission signals and the reception signals having different respective frequencies, by switching one antenna, comprising:

a transmitter/receiver having a microphone and a speaker;

a first signal processing part for converting an output signal output from the microphone of said transmitter/receiver into a transmission base band signal;

a modulation part for performing predetermined modulation processing upon the transmission base band signal output from said first signal processing part;

a transmission part for converting a modulated signal output from said modulation part into a transmission signal having a first frequency in a first frequency band;

an antenna duplexer unit including a high-frequency switching circuit for receiving the transmission signal output from said modulation part and supplying the transmission signal to the antenna, a delay circuit having a characteristic impedance and first and second ends for delaying a signal passing between said first and second ends for a predetermined delay period, said first end of said delay circuit being coupled to the one antenna, and a band-pass filter having an input end coupled to said second end of said delay circuit and having a reception impedance at a second frequency in a second frequency band nonoverlapping with the first frequency band such that a received signal received by the antenna which has the second frequency in the second frequency band nonoverlapping with the first frequency band is passed, and having an increased impedance in the first frequency band such that the transmission signal in the first frequency band is suppressed and a reflected signal having a phase characteristic advanced by a predetermined phase advance period is supplied, the reflected signal being delayed by the predetermined delay period while passing through said delay circuit such that a sum of the predetermined delay of the transmission signal passing through said delay circuit and the predetermined delay of the reflected signal passing through said delay circuit is complementary to the predetermined phase advance period and the reflected signal exiting said delay circuit has a substantially zero phase shift from the transmission signal in the first frequency band;

a reception part for receiving the received signal output from said antenna duplexer unit and received by the antenna, and converting the received signal into a reception signal;

a demodulation part for performing upon the reception signal output by said reception part demodulation processing corresponding to the modulation processing performed in said modulation part and supplying a base band signal generated therefrom; and a second signal processing part for converting the base band signal output from said demodulation part into an audio signal and supplying the audio signal to the speaker of said transmitter/receiver.

15. The transmitting and receiving apparatus according to claim 14, wherein the characteristic impedance of said delay circuit is equal to an impedance of the antenna.

16. The transmitting and receiving apparatus according to claim 14, wherein said antenna duplexer unit further includes an inductance circuit connected in parallel with the high-frequency switching circuit, the inductance circuit having a predetermined inductance and parallel-resonating together with a capacitance component of the high-frequency switching circuit in the first frequency band.

* * * * *